United States Patent
Siddiqui (10) Patent No.: US 10,754,377 B2
(45) Date of Patent: Aug. 25, 2020

(54) HINGED DEVICE

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/656,776

(22) Filed: Jul. 21, 2017

(65) Prior Publication Data

US 2018/0292860 A1  Oct. 11, 2018

Related U.S. Application Data

(60) Provisional application No. 62/482,035, filed on Apr. 5, 2017.

(51) Int. Cl.
*G06F 1/16* (2006.01)
*H04M 1/02* (2006.01)

(52) U.S. Cl.
CPC .......... *G06F 1/1618* (2013.01); *G06F 1/1652* (2013.01); *G06F 1/1681* (2013.01); *H04M 1/0216* (2013.01); *H04M 1/022* (2013.01); *H04M 1/0268* (2013.01)

(58) Field of Classification Search
CPC .... G06F 1/1616; G06F 1/1618; G06F 1/1681; G06F 1/1656; G06F 1/1652; G06F 1/16; G09F 9/301; H04M 1/0216; H04M 1/0268
USPC .............. 361/679.01, 679.3, 679.27, 679.56; 455/575.3
See application file for complete search history.

(56) References Cited

U.S. PATENT DOCUMENTS

| | | |
|---|---|---|
| 9,176,535 B2 | 11/2015 | Bohn et al. |
| 9,250,733 B2 | 2/2016 | Lee et al. |
| 9,348,450 B1 | 5/2016 | Kim |
| 9,477,269 B2 | 10/2016 | Morrison et al. |
| 9,557,771 B2 | 1/2017 | Park et al. |
| 9,857,849 B1 | 1/2018 | Siddiqui et al. |

(Continued)

FOREIGN PATENT DOCUMENTS

| | | |
|---|---|---|
| EP | 1464784 A1 | 10/2004 |
| EP | 2728432 A1 | 5/2014 |

(Continued)

OTHER PUBLICATIONS

Price, Rob, "Analysts think that Samsung will launch a smartphone with a foldable screen this year," retrieved at <<http:\\www.businessinsider.in/Analysts-think-that-Samsung-will-launch-a-smartphone-with-a-foldable-screen-this-year\articleshow/50469072.cms>>, published on Jan. 6, 2016, 37 pages.

(Continued)

*Primary Examiner* — Daniel P Wicklund
*Assistant Examiner* — Sagar Shrestha
(74) *Attorney, Agent, or Firm* — Rainier Patents, P.S.

(57) ABSTRACT

The description relates to hinged devices, such as hinged computing devices. One example can include a first portion and a second portion that have hinge ends rotatably secured by a hinge assembly. The example can also include a flexible display positioned over the first portion, the hinge assembly, and the second portion. The example can further include a deployable bridge support that is deployed to support the flexible display at the hinge assembly when the first and second portions are rotated from a closed orientation to an open orientation.

22 Claims, 12 Drawing Sheets

(56) References Cited

U.S. PATENT DOCUMENTS

| | | |
|---|---|---|
| 10,227,808 B2 | 3/2019 | Siddiqui |
| 10,241,548 B2 | 3/2019 | Tazbaz et al. |
| 10,296,044 B2 | 5/2019 | Siddiqui et al. |
| 10,306,783 B2 | 5/2019 | Seo et al. |
| 10,306,788 B2 | 5/2019 | Bi et al. |
| 10,344,510 B2 | 7/2019 | Siddiqui et al. |
| 2012/0120618 A1* | 5/2012 | Bohn .................. G06F 1/1618 361/749 |
| 2012/0307472 A1 | 12/2012 | Bohn et al. |
| 2013/0021762 A1 | 1/2013 | Van Dijk et al. |
| 2014/0042293 A1 | 2/2014 | Mok et al. |
| 2014/0111954 A1 | 4/2014 | Lee et al. |
| 2015/0116917 A1 | 4/2015 | Aono |
| 2015/0153787 A1 | 6/2015 | Mok et al. |
| 2015/0185782 A1 | 7/2015 | Kim et al. |
| 2015/0233162 A1 | 8/2015 | Lee et al. |
| 2015/0241978 A1 | 8/2015 | Lombardi et al. |
| 2015/0378397 A1 | 12/2015 | Park et al. |
| 2016/0085265 A1* | 3/2016 | Park .................. G06F 1/1681 361/807 |
| 2016/0109908 A1 | 4/2016 | Siddiqui |
| 2016/0378203 A1 | 12/2016 | Kim et al. |
| 2017/0013729 A1 | 1/2017 | Rothkopf et al. |
| 2017/0060188 A1* | 3/2017 | Han .................. G06F 1/1652 |
| 2017/0115701 A1 | 4/2017 | Bae et al. |
| 2017/0145724 A1 | 5/2017 | Siddiqui |
| 2017/0201607 A1* | 7/2017 | Xu .................. H04M 1/0268 |
| 2017/0272559 A1 | 9/2017 | Cavallaro et al. |
| 2018/0066465 A1 | 3/2018 | Tazbaz et al. |
| 2018/0196467 A1* | 7/2018 | Watamura .............. G06F 1/1616 |
| 2018/0196468 A1* | 7/2018 | Watamura .............. G06F 1/1616 |
| 2018/0213663 A1* | 7/2018 | Lin .................. G06F 1/1618 |
| 2019/0005857 A1 | 1/2019 | Wakata |
| 2019/0082544 A1 | 3/2019 | Park |
| 2019/0094917 A1 | 3/2019 | Schmelzle et al. |
| 2019/0278338 A1 | 9/2019 | Siddiqui |

FOREIGN PATENT DOCUMENTS

| | | |
|---|---|---|
| EP | 2728433 A1 | 5/2014 |
| EP | 3109847 A1 | 12/2016 |
| EP | 3386172 A1 | 10/2018 |
| KR | 20170142597 A | 12/2017 |
| KR | 20190042530 A | 4/2019 |
| WO | 2017114465 A1 | 7/2017 |

OTHER PUBLICATIONS

"International Search Report & Written Opinion for PCT Application No. PCT/US19/020179", dated May 24, 2019, 11 Pages.

"Notice of Allowance Issued in U.S. Appl. No. 16/275,097", dated Sep. 23, 2019, 10 Pages.

"International Search Report and Written Opinion Issued in PCT Application No. PCT/US2018/024698", dated Jun. 8, 2018, 13 Pages.

"Non Final Office Action Issued in U.S. Appl. No. 16/363,931", dated Dec. 30, 2019, 11 Pages.

"Notice of Allowance Issued in U.S. Appl. No. 16/404,592", dated Sep. 19, 2019, 9 Pages.

"International Search Report and Written Opinion Issued in PCT Application No. PCT/US19/049622", dated Dec. 3, 2019, 12 Pages.

"International Search Report and Written Opinion Issued in PCT Application No. PCT/US2019/063127", dated Mar. 17, 2020, 10 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions. A flexible display can be secured to both the first and second portions. The hinge assembly can provide several features that facilitate the use of a single flexible display. First, the hinge assembly can change lengths during rotation of the first and second portion to reduce stresses imparted on the flexible display. Second, the hinge assembly can maintain a minimum bend radius for the flexible display during rotation to protect the flexible display from damage (e.g., crimping). Third, the hinge assembly can support the flexible display when the first and second portions are rotated to a 180-degree 'flat' orientation so that user interaction with the flexible display over the hinge assembly is the same or similar to interaction with other areas of the flexible display (e.g., similar tactile feel). These and other features are described below.

Figure 1A:
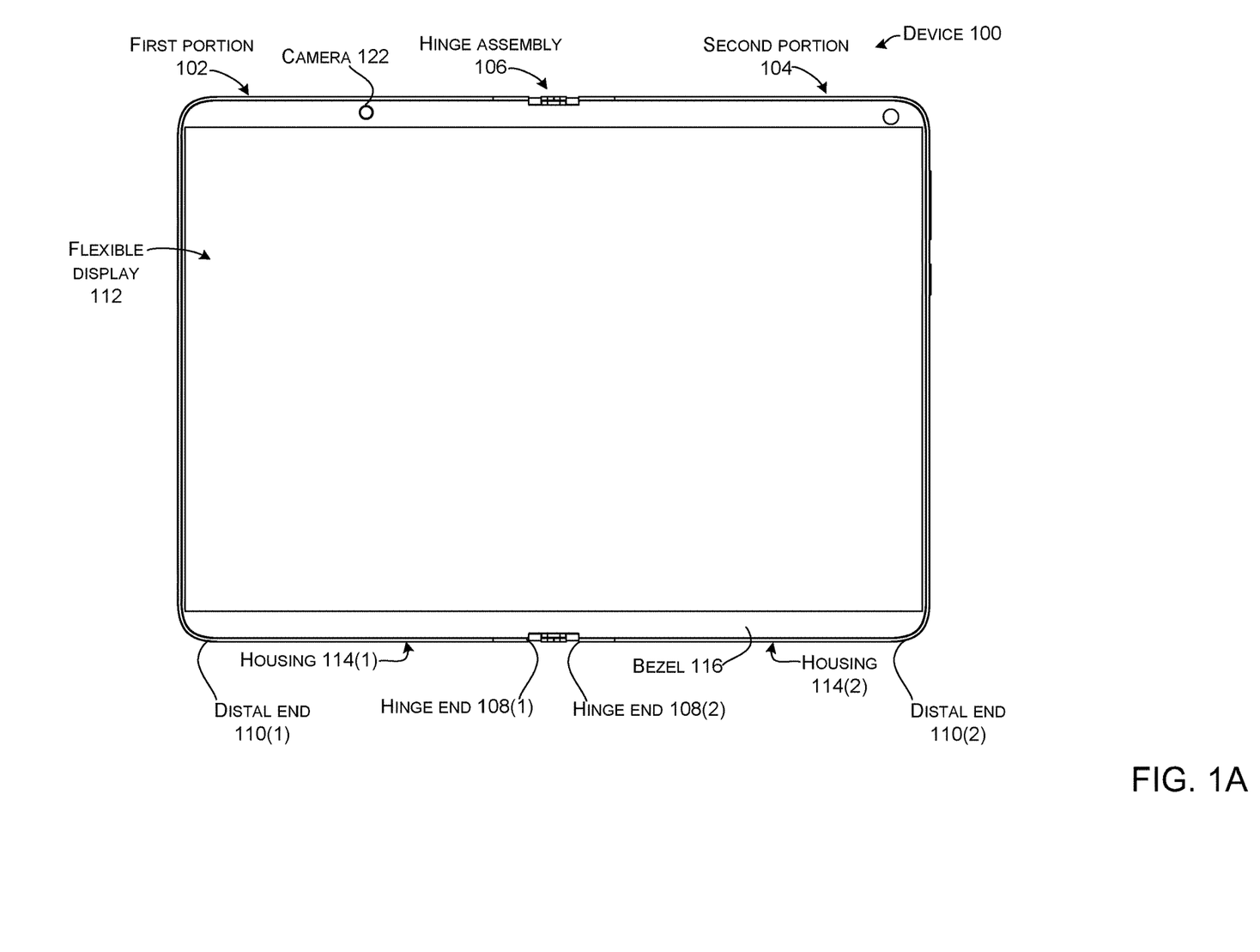
FIGS. 1A, 2A, 2B, 3, 4A, 5A, 6A, 7A, 8A, and 9A show elevational views of example devices in accordance with some implementations of the present concepts.
Figure 1B:
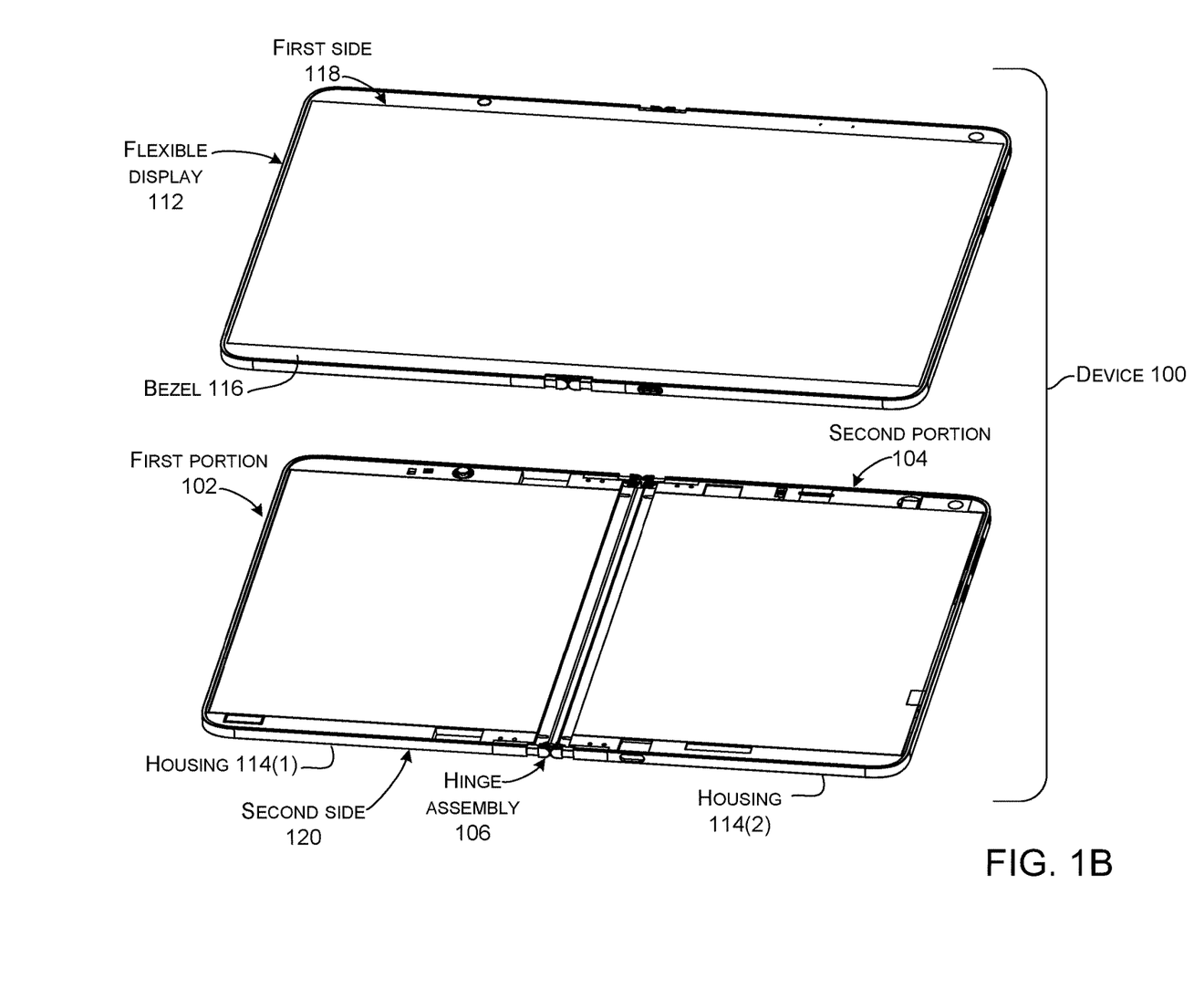
FIGS. 1B and 4B show perspective views of example devices in accordance with some implementations of the present concepts.

Introductory FIGS. 1A and 1B show an example device 100 that has first and second portions 102 and 104 that are rotatably secured together by a hinge assembly 106.

The first portion 102 and the second portion 104 can extend from a hinge end 108 to a distal end 110. A flexible display 112 can be positioned over the first portion 102, the hinge assembly 106, and the second portion 104. An example flexible display that is commercially available is an organic light emitting diode (OLED) display, though other types may be available and/or become available. The flexible display can be secured to a housing 114 of both the first and second portions by a bezel 116 and/or by other mechanisms. For purposes of explanation, the device can be described as having a first side or surface 118 (facing upwardly in FIG. 1B) upon which the flexible display 112 is positioned and a second opposite side or surface 120 (facing downwardly in FIG. 1B).

Note that one or more components, such as camera 122, may be positioned relative to the bezel 116. Securing the flexible display 112 in a fixed relation to both the first and second portions 102 and 104 can allow the flexible display to maintain a fixed physical relationship to these and/or other components. Further, securing the flexible display to both the first and second portions can enable more reliable electrical connections between the flexible display and other elements, such as a graphics processor (not shown) positioned on the first or second portions, than if the flexible display moved relative to one or both of the first and second portions during rotation.

Figures 2A, 2B:
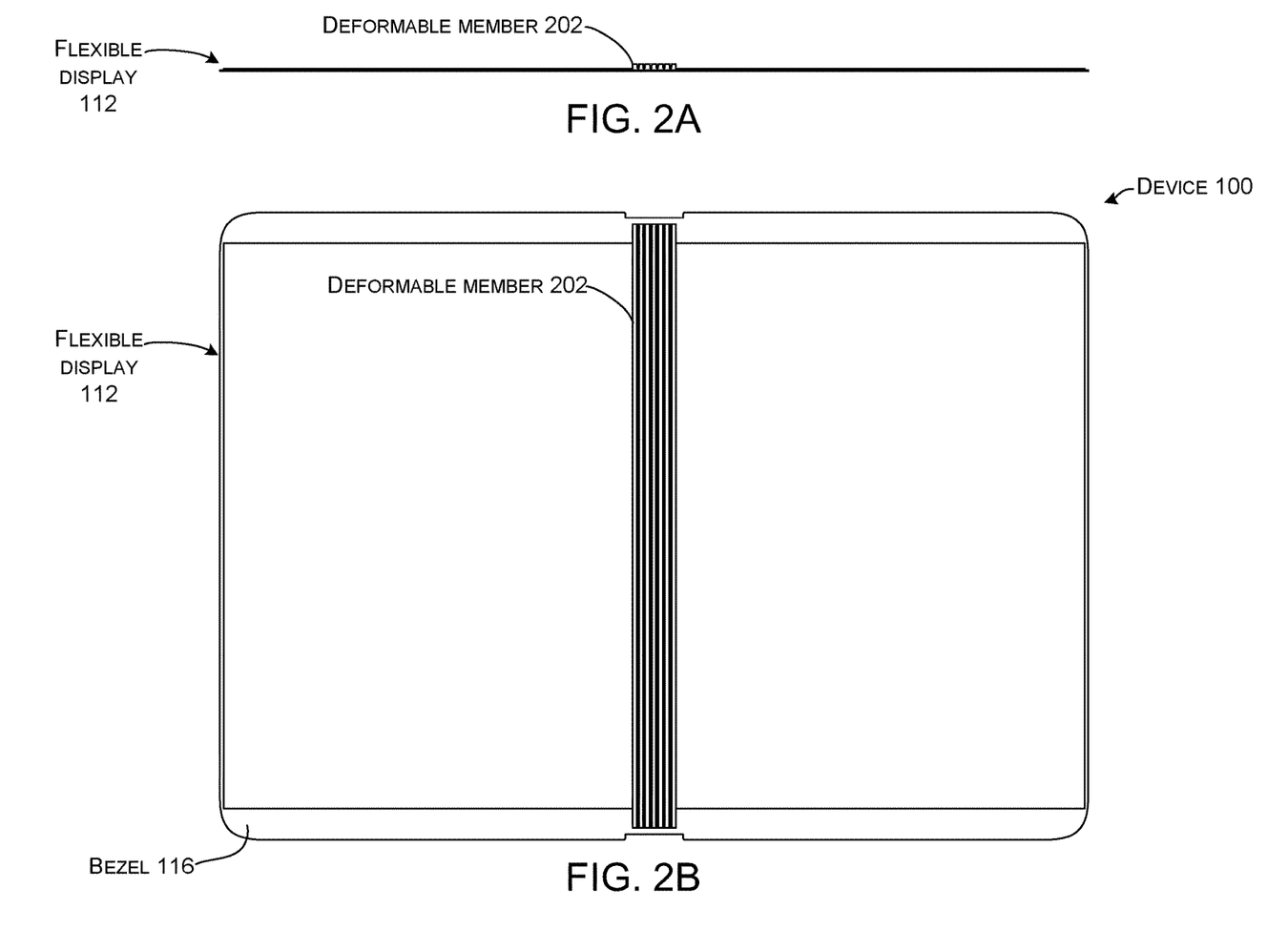

FIGS. 2A and 2B show the flexible display 112 secured to a re-enforcing material. In this case, the re-enforcing material entails a deformable member 202, such as an elastomeric material. In this example, the deformable member 202 entails a corrugated pattern extending along the hinge assembly 106 (FIGS. 1A and 1B). The corrugated pattern can be on one side (shown) or both sides. The corrugated pattern can allow the deformable member to accommodate a range of orientations as will be explained below relative to FIGS. 5A-9D.

The deformable member 202 can be configured to be positioned between the flexible display 112 and the hinge assembly (106, FIGS. 1A and 1B). In the open orientation of FIGS. 1A and 1B, the deformable member 202 can function to support the flexible display 112 over the hinge assembly 106 to create a uniform tactile feel across the device 100. Stated another way, without the deformable member 202, the flexible display might feel 'mushy' to the user over the hinge assembly 106 and solid over the first and second portions 102 and 104.

Figure 3:
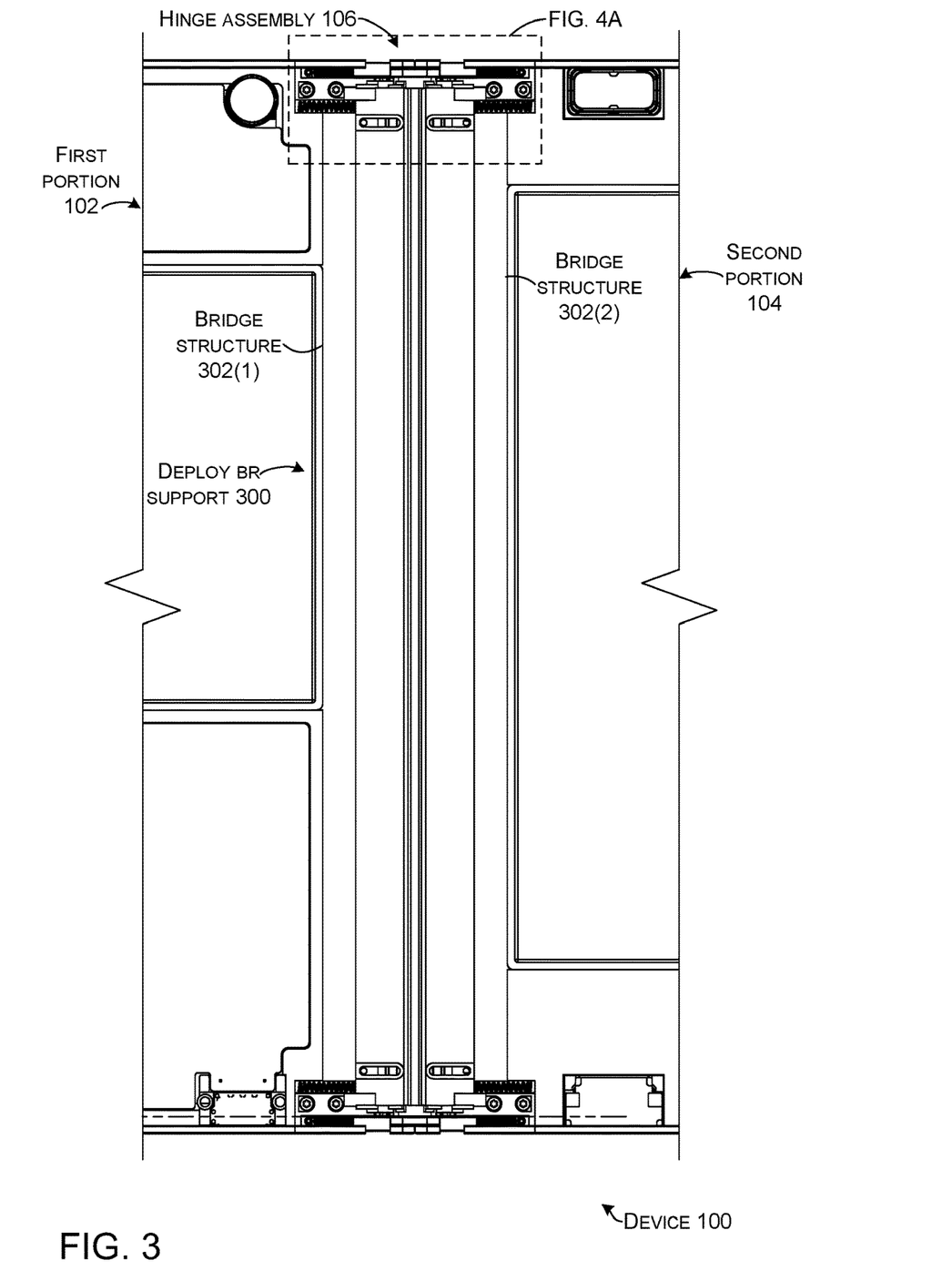

FIG. 3 shows regions of the first and second portions 102 and 104 joined to the hinge assembly 106 and oriented at 180-degrees. The flexible display 112 has been removed to show underlying elements. The hinge assembly can include a deployable bridge support 300 that can be deployed to support the flexible display at the hinge assembly when the first and second portions are rotated from a closed orientation to an open orientation.

In this case, the deployable bridge support 300 can entail a bridge structure 302 that can be deployed over the hinge assembly 106 in the 180-degree orientation. In this particular configuration, two bridge structures 302(1) and 302(2) are employed. The first bridge structure 302(1) can be associated with the first portion 102, and the second bridge structure 302(2) can be associated with the second portion 104. When deployed in the 180-degree orientation, the bridge structures can cooperatively support the flexible display 112 at the hinge assembly 106. In this example, the bridge structures 302 directly support the deformable member (202, FIGS. 2A and 2B), and thus indirectly support the flexible display (112, FIGS. 2A and 2B). In other examples, the bridge structures 302 can directly support the flexible display 112 (e.g. contact the flexible display).

The support offered by the bridge structures 302 can contribute to tactile symmetry across the flexible display 112 over the first portion 102, the hinge assembly 106, and the second portion 104 in the 180-degree orientation (e.g., the flexible display can feel substantially the same to the user across the entire device 100).

When the first and second portions 102 and 104 are rotated to other orientations (e.g., less than or more than 180 degrees) the bridge structures 302 can be moved to allow room for the flexible display (112, and/or the deformable member 202 FIGS. 2A and 2B) to bend at the hinge assembly 106. In the illustrated implementation, the bridge structures 302 can be moved by withdrawing the bridge structures 302 from the hinge assembly 106 toward the first and second portions 102 and 104. This aspect is discussed in more detail below relative to FIGS. 5B and 5D, 6B and 6D, 7B and 7D, 8B and 8D, and 9B and 9D.

Figure 4A:
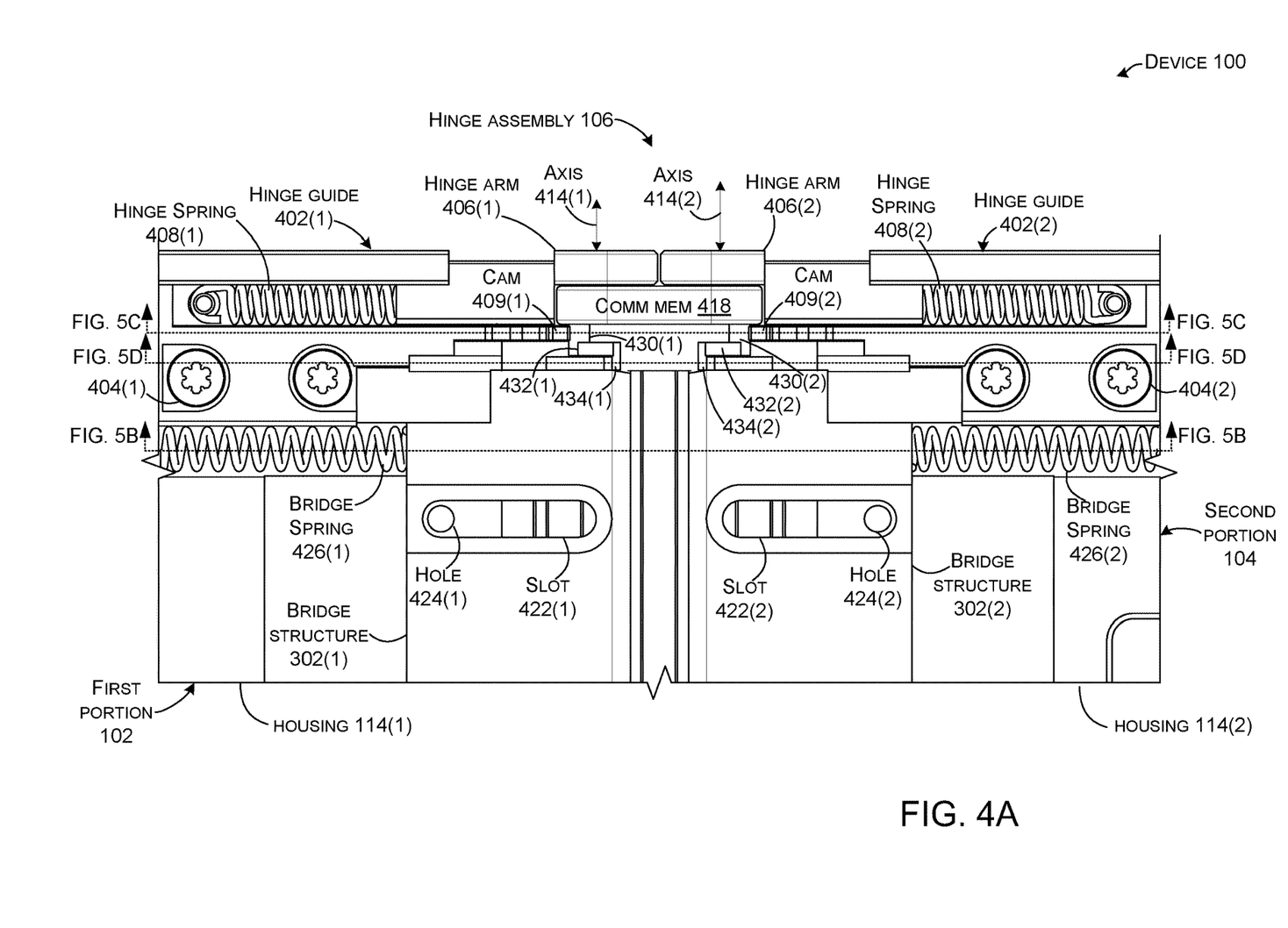
Figure 4B:
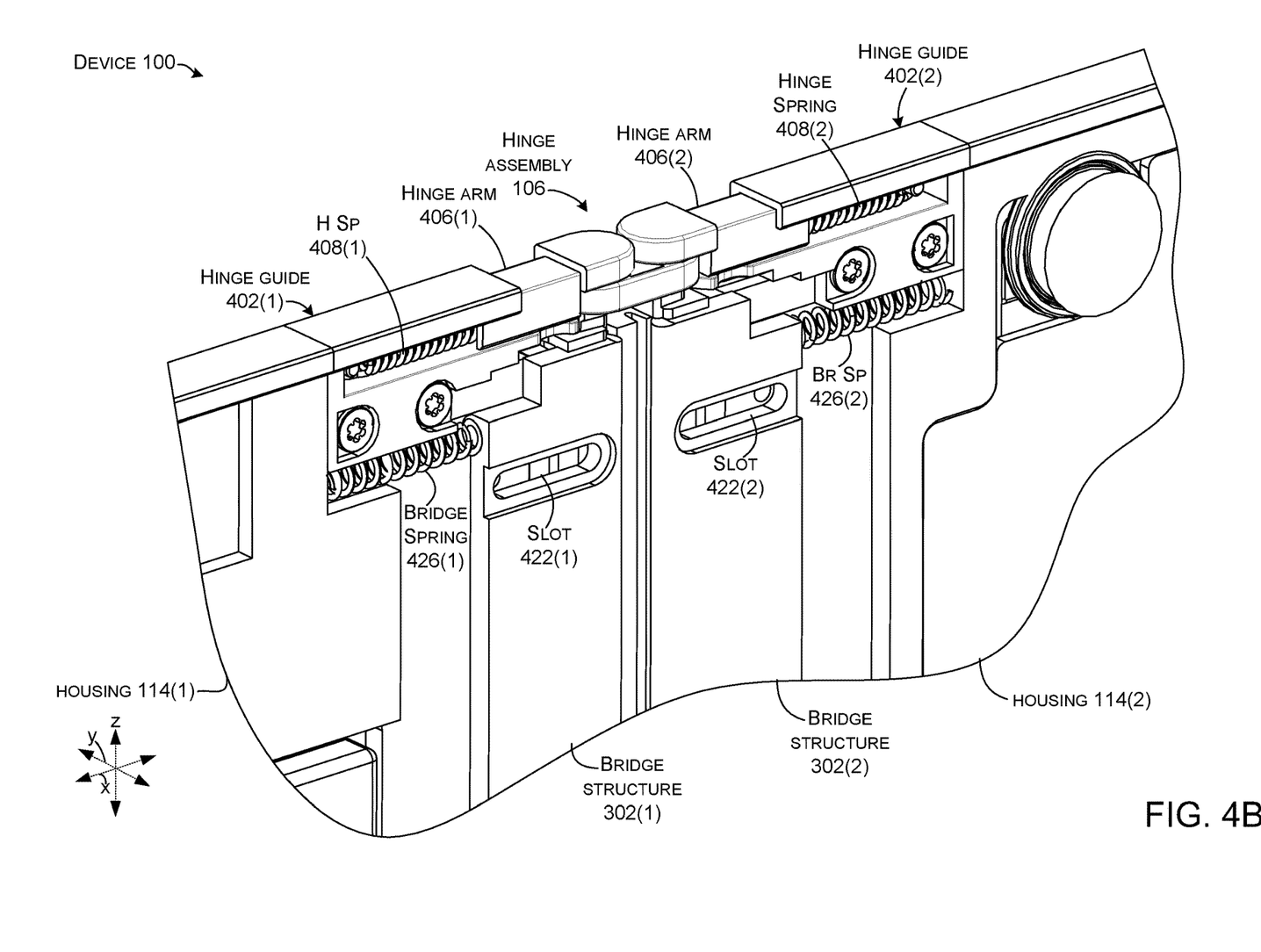
Figure 4C:
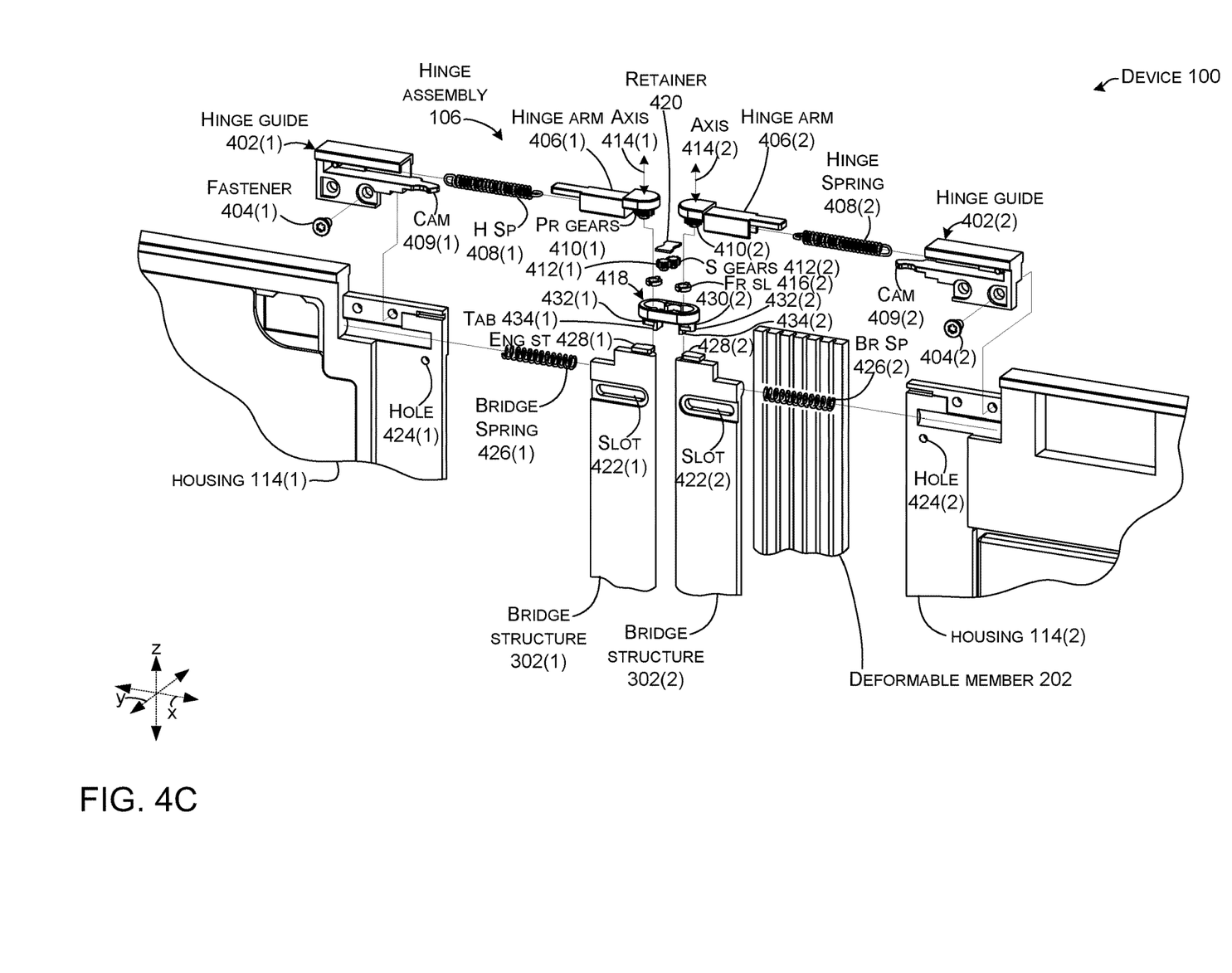
FIG. 4C shows an exploded perspective view of an example device in accordance with some implementations of the present concepts.

FIG. 4A shows a more detailed view of a portion of device 100 as indicated in FIG. 3. FIG. 4B shows a similar perspective view and FIG. 4C shows a similar exploded perspective view. Collectively, FIGS. 4A-4C show additional elements of device 100. (More of these elements are visible in the exploded perspective view of FIG. 4C than in FIGS. 4A and 4B). Deformable member 202 is shown in FIG. 4C and removed in FIGS. 4A and 4B.

Example device 100 can include hinge guides 402 that can be secured to housings 114 by fasteners 404 (not all of which are shown or designated with specificity). The hinge guides 402 can receive hinge arms 406 that can be biased into the hinge guides by hinge springs 408. The hinge guides 402 can define cams 409.

The hinge arms 406 can include primary gears 410 which can interact with secondary gears 412. (An alternative implementation can omit the secondary gears and employ directly engaging primary gears). The hinge arms 406 can define hinge axes 414 of the hinge assembly 106. The hinge arms 406 can be positioned relative to friction sleeves 416 and received in a communication member 418. The friction sleeves 416 can provide resistance to rotation between the communication member 418 and the hinge arms 406 so that the hinge arms maintain an orientation set by the user until the user changes the orientation (e.g., the device maintains whatever orientation the user puts it in).

The secondary gears 412 can be maintained in the communication member 418 by a retainer 420. The primary and secondary gears can control rotation of the hinge arms 406 so that equal degrees of rotation occur around each hinge axis 414. For instance, 20 degrees of rotation of hinge arm 406(1) around hinge axis 414(1) occurs concurrently with 20 degrees of rotation of hinge arm 406(2) around hinge axis 414(2). Thus, the communication member 418 can rotationally retain the hinge arms 406 while defining a distance between the hinge arms (e.g., distance between the hinge axes 414 does not change during rotation).

As mentioned above relative to FIG. 3, the bridge structures 302 can be moveable during rotation. In this case, the bridge structures 302 can be moveable in that they can be slideably secured to the housing 114. In this example, the bridge structures 302 define slots 422. A fastener (not shown, but similar to fastener 404) can pass through an individual slot 422 into a hole 424 in the housing 114 to associate the bridge structure and the housing. Note that this fastener should 'bottom out' or otherwise be stopped before it tightens the bridge structure to the housing to allow relative movement between the bridge structure 302 and the housing 114. For instance, shoulder screws can be employed so that the fastener does not clamp down on the bridge structure. Bridge springs 426 can operate between the housing 114 and the bridge structures 302. In this example, the bridge springs 426 can serve to bias the bridge structures 302 away from the housing 114 and toward the hinge assembly 106 (e.g., toward the hinge axes 414).

The bridge structures 302 can also define engagement structures 428. The communication member 418 can define cam followers 430, paddles 432, and/or tabs 434 (see FIG. 4A). The cam followers 430 can engage cams 409. Tabs 434 can interact with engagement structures 428 on the bridge structures 302. (Note that the tabs 434 can be cams that act on cam followers embodied as the engagement structures 428. However, to avoid confusion with cams 409 and cam followers 430, the terms "tabs" 434 and "engagement structures" 430 are used throughout).

Figures 5A, 5B, 5C, 5D:
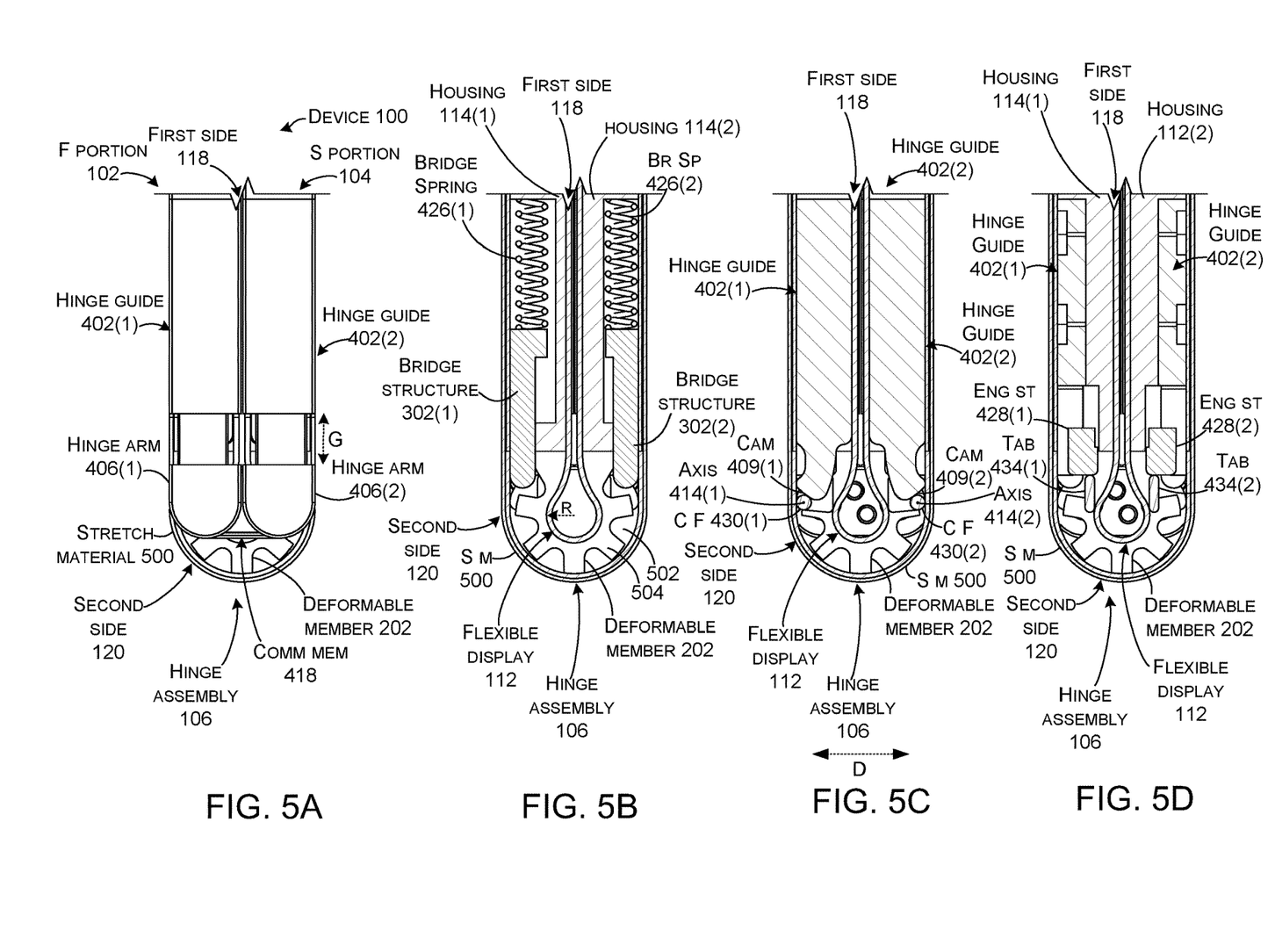
FIGS. 5B-5D, 6B-6D, 7B-7D, 8B-8D, and 9B-9D show sectional views of example devices in accordance with some implementations of the present concepts.

FIGS. 5A-9D collectively show features of the hinge assembly 106. FIGS. 5A-5D show the first and second portions 102 and 104 parallel to and against one another at a zero-degree orientation with the first side 118 and the flexible display 112 facing inwardly and the second side 120 facing outwardly. FIG. 5A is an elevational view, and FIGS. 5B-5D are sectional views as indicated in FIG. 4A. FIGS. 6A-6D are similar views to FIGS. 5A-5D at a 120-degree orientation rather than a zero-degree orientation. FIGS. 7A-7D show a 180-degree orientation (e.g., first and second portions parallel and abutting). Similarly, FIGS. 8A-8D are similar views at 300-degrees, and FIGS. 9A-9D are 360-degree views (e.g., parallel to and positioned over one another, but in this case, opposite sides are facing one another when compared to FIGS. 5A-5D; second side 120 facing inwardly and first side 118 and flexible display 112 facing outwardly). Note that while the drawings are organized by orientation, it may be helpful for the reader to also compare specific cross-sections at multiple orientations. For instance, the function of the elements shown in FIG. 5B may be understood by reviewing FIG. 5B in combination with FIGS. 6B, 7B, 8B, and/or 9B.

In the zero-degree orientation of FIGS. 5A-5D, the first side 118 and the flexible display 112 are inwardly facing and the second side 120 is outwardly facing. The second side 120 can entail a stretchable material 500 that covers the hinge assembly 106, first portion 102, and/or second portion 104. The stretchable material 500 can accommodate shape and/or length changes experienced on the second surface in relation to the hinge assembly 106 during rotation.

FIG. 5A shows a gap G defined between the hinge arms 406 and the hinge guides 402. The hinge springs (408, FIG. 4C) are biasing the hinge arms 406 and the hinge guides 402 together. The relationship of the hinge arms 406 and the hinge guides 402 as reflected in gap G is controlled by first the hinge springs and second the cams 409 interacting with cam followers 430 (FIG. 5C).

FIG. 5B shows the bridge structures 302 are withdrawn from the hinge assembly 106 into the first and second portions 102 and 104 (e.g., into housing 114(1) and 114(2)) (FIG. 5B)). The bridge springs 426 bias the bridge structures 302 toward the hinge assembly 106. However, in this orientation, the spring bias (of the bridge springs) is overcome and the bridge springs 426 are compressed.

As illustrated in FIG. 5D, the position of the bridge structures 302 is dictated by the bridge structures' engagement structures 428 engaging ends of tabs 434. Stated another way, the interaction of the engagement structures and the tabs is preventing the bridge springs (426, FIG. 5B) from biasing the bridge structures 302 toward the hinge assembly 106, and instead the bridge springs are compressed and the bridge structures are positioned in the first and second portions 102 and 104 (e.g., in the housing 114).

In this case, as shown in FIG. 5D the engagement structures 428 are oriented perpendicular to the tabs 434 and are engaging a first end of the tabs. The engagement structures 428 are blocked from moving toward the hinge assembly 106 by the tabs 434 despite the bias created by the bridge springs 426. Recall that the communication member 418 (FIG. 5A) defines the cam followers 430 and the tabs 434 (FIG. 5D). The communication member spans between the first and second portions 102 and 104 and is fixed. Thus, the bridge springs 426 are biasing the bridge structures 302 toward the hinge assembly 106, but the extent of the bias (e.g., the position of the bridge structures 302) is controlled by the interaction of the bridge structures' engagement structures 428 with the tabs 434 as evidenced in FIG. 5D. Thus, the position of the bridge structures 302 is effected by the bridge springs 426 and the countervailing interaction of the engagement structures 428 and the tabs 434.

Stated another way, the position of the tabs 434 is fixed so the interaction with the engagement structures 428 blocks further movement of the bridge structures 302 into the hinge assembly 106 and from the first and second portions 102 and 104 (e.g., housing 114(1) and 114(2)) and results in compression of bridge springs 426 (FIG. 5B).

Looking at FIG. 5C, the cam followers 430 define the hinge axes 414, and the cam followers are fixed such that a distance D between them is constant during the range of rotation of the first and second portions 102 and 104. From one perspective, the cam followers 430 are fixed and the other elements rotate around the cam followers during rotation. (Compare FIGS. 5C, 6C, 7C, 8C, and 9C).

As mentioned above, the hinge springs (408, FIG. 4C) bias the hinge guides 402 and the hinge arms 406 toward one another. However, the distance between the hinge guides and the hinge arms (as reflected by gap G) is determined by the engagement of the cams 409 (of the hinge guides 402) engaging the cam followers 430 of the communication member 418 (recall that the hinge arms rotate relative to the communication member at a fixed distance). Thus, at this zero-degree orientation, the cams 409 are engaging cam followers 430 which define the extent the hinge guides 402 and the hinge arms 406 can approach one another as reflected in gap G. As such, a profile of cams 409 can dictate the extent of the gap G during rotation to accommodate the length of the flexible display 112 so that the flexible display is not exposed to damaging tension or compression during rotation. Stated another way, the neutral axis of the hinge assembly 106 resides between the first side 118 and the second side 120 rather than at the flexible display 112. The profile of the cams 409 can adjust the length of the hinge assembly 106 and hence the neutral axis to accommodate the length of the flexible display during rotation.

Returning to FIG. 5B, note that the absence of the bridge structures 302 in the hinge assembly 106 can allow the deformable member 202 and the flexible display 112 to distend outwardly against the second side 120. The outward distention of the deformable member 202 can define a minimum bend radius R (FIG. 5B) of the flexible display 112 to protect the flexible display from being kinked or otherwise damaged when folded in the closed zero-degree orientation. In the illustrated configuration of FIG. 5B, the minimum bend radius R allows the flexible display to assume a light bulb shape at the hinge assembly 106 when the flexible display is bent back upon itself. This light bulb shape can protect the flexible display from damage caused by bending at a smaller radius than it was designed to handle.

FIG. 5B also shows how the corrugated pattern of the deformable member 202 can facilitate shaping the flexible display 112. The splits or gaps 502 interspersed between material 504 in the corrugated pattern can adjust to the orientation of the device (e.g., open wider, narrower, and/or close). For instance, compare FIG. 5B to FIGS. 6B, 7B, 8B, and 9B (e.g., gaps open widest in FIG. 5B and progressively narrow until closed in FIG. 9B).

FIGS. 6A-6D show the first and second portions 102 and 104's rotation to an orientation of about 120 degrees (e.g., 60 degrees of rotation has occurred around each hinge axis 414 since the zero-degree orientation of FIGS. 5A-5D).

Figures 6A, 6B:
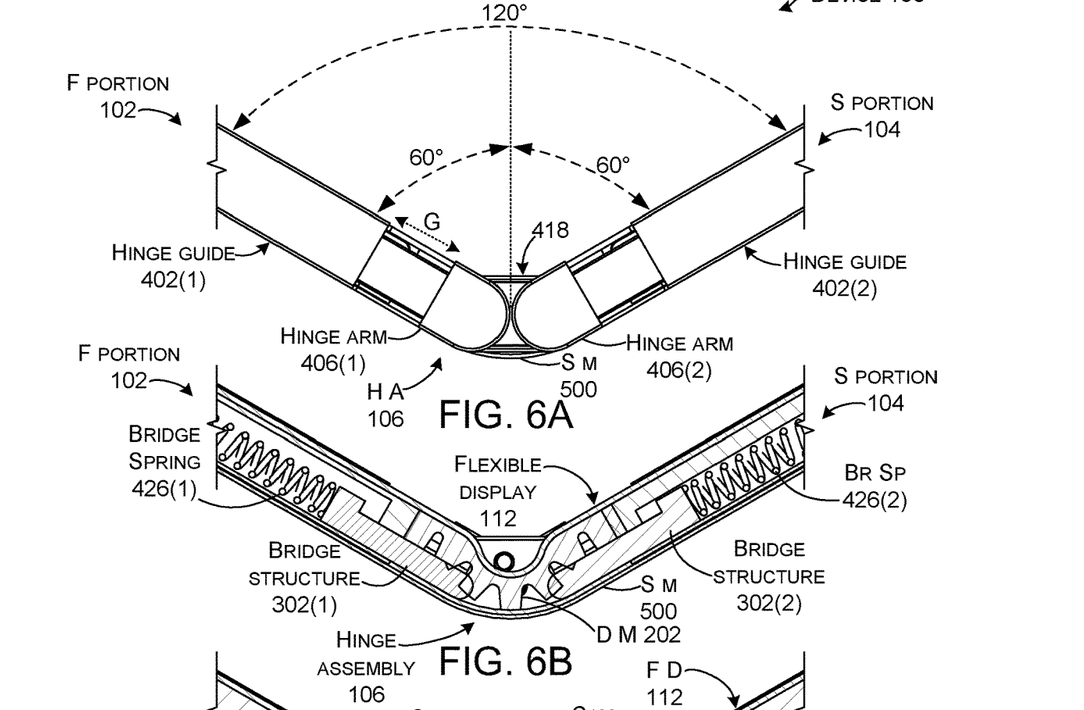

FIG. 6A shows gap G has increased since the hinge guides 402 have been biased away from the hinge arms 406. This gap is controlled by the elements show in FIG. 6C.

Figures 6C, 6D:
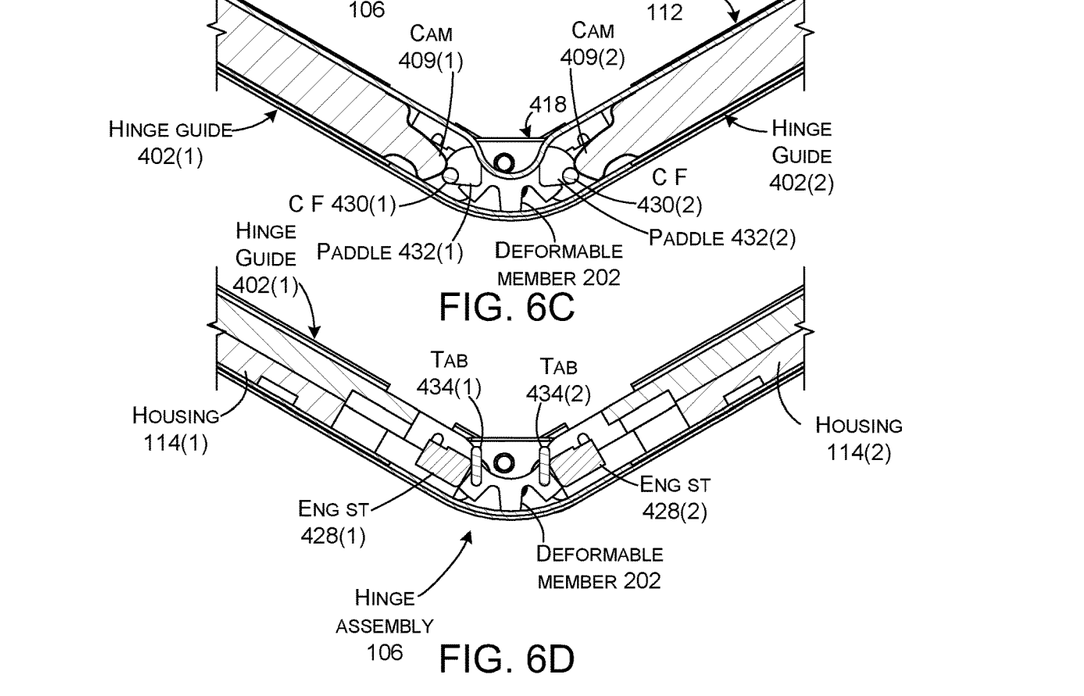

FIG. 6C shows the hinge guides 402 continuing to be biased toward the communication member 418 by the hinge springs (408, FIGS. 4A-4C). The position of the hinge guides is controlled by the cams 409's engagement with cam followers 430 on the communication member 418. At this range in the rotation (reflected in FIGS. 6C and 7C) the device is producing the greatest cam lift which produces the greatest gap G in the range of rotation. Also at this orientation, paddles 432 are engaging the flexible display 112 and encouraging the flexible display towards a linear configuration.

FIG. 6D shows the bridge structures' engagement structures 428 now engaging a flat portion of the tabs 434 rather than the end as shown in FIG. 5D. Thus, FIG. 6B shows the bridge structures 302 being biased from the first and second portions 102 and 104 (e.g., from the housing 114) toward the hinge assembly 106 by the bridge springs 426. Thus, the bridge structures 302 are positioned farther into the hinge assembly 106 than in the zero-degree orientation of FIG. 5B and will be even more so in the 180-degree orientation of FIG. 7C.

Figure 7A:
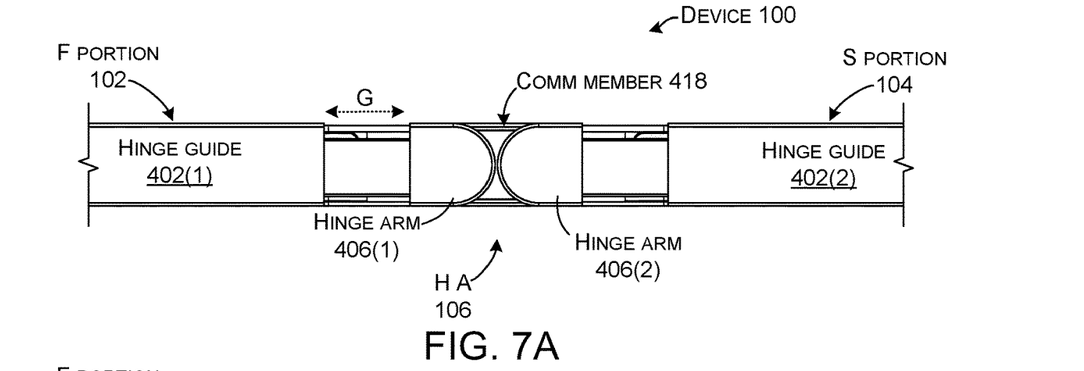

FIGS. 7A-7D show the first and second portions 102 and 104 at 180-degree orientations (e.g., parallel with their ends abutting). FIG. 7A shows gap G adjusted to accommodate a length of the flexible display (112, FIG. 7B). As mentioned above, gap G is controlled by the elements illustrated in FIG. 7C.

Figure 7B:
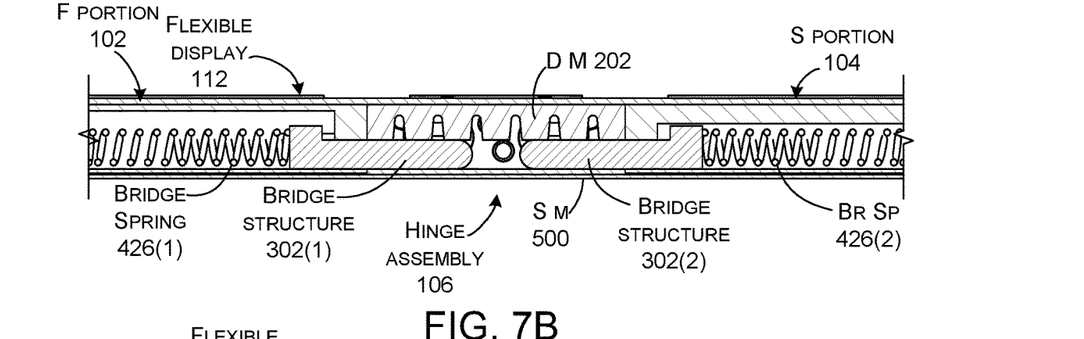

FIG. 7B shows the bridge structures 302 biased into the hinge assembly 106 by bridge springs 426. Recall from FIGS. 5D and 6D that this bias was countered by the bridge structures' engagement structures 428 encountering tabs 434 of the communication member 418. In FIG. 7D, the engagement structures 428 are encountering the long sides of the tabs and as a result are able to move closer to one another than in the previous orientations. This allows the bridge structures 302 to move toward one another due to bias imparted by bridge springs 426. As shown in FIG. 7B, bridge structures 302 have moved toward one another in the hinge assembly 106 and can support the deformable member 202 to maintain a linear profile under the flexible display 112. Hence the bridge structures can indirectly support the flexible display 112 across the hinge assembly 106 so that the flexible display over the hinge assembly has a similar feel (e.g., rigidity when pushed on orthogonally by the user) as over the first and second portions 102 and 104.

Figure 7C:
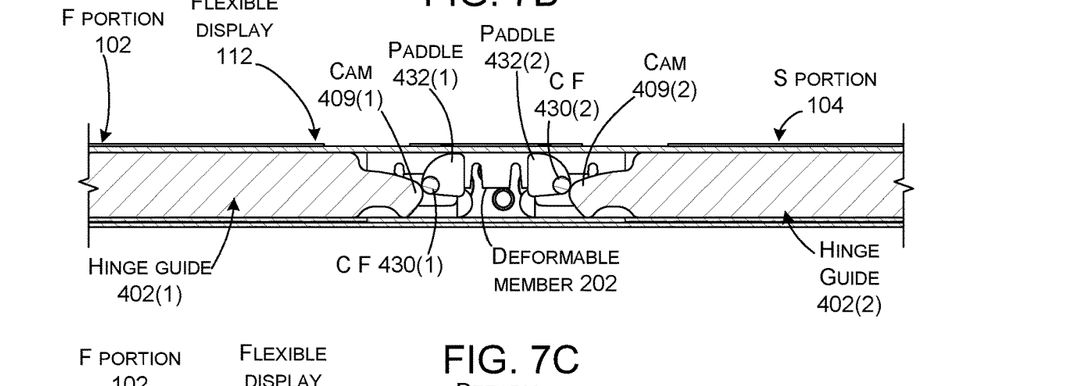
Figure 7D:
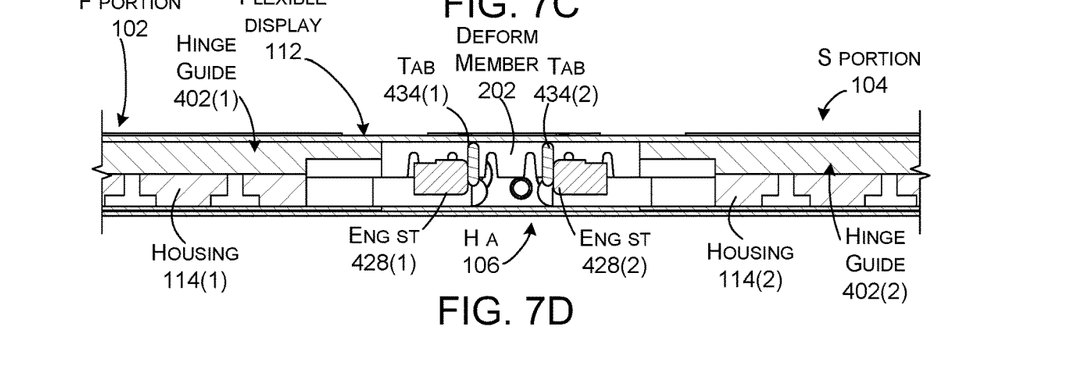

FIG. 7C shows cams 409 of the hinge guides 402 engaging cam followers 430. Recall that hinge springs 408 bias the hinge guides 402 and the communication member 418 together (via the hinge arms 406). This bias is countered by the cams 409 encountering the cam followers 430 which define the gap G of FIG. 7A. At this point in the rotation, the cams are providing 'high' lift which causes gap G to be relatively large. FIG. 7C also shows paddles 432 encouraging the flexible display 112 into a linear orientation over the hinge assembly 106 from the curvilinear orientation shown in FIGS. 5C and 6C.

FIGS. 8A-8D show the device 100 with the first and second portions 102 and 104 oriented to about 300 degrees and the flexible display 112 is now on the outside.

Figures 8A, 8B:
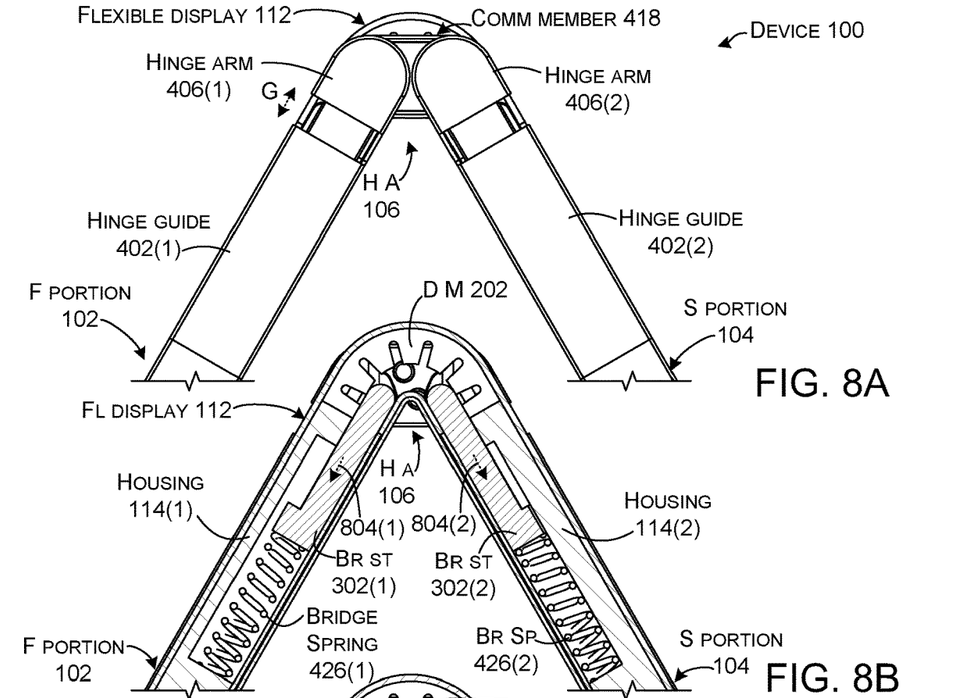

FIG. 8A shows gap G has decreased as the hinge assembly 106 continues to adjust the combined lengths of the first portion 102, the hinge assembly 106, and the second portion 104 to accommodate the flexible display 112 (e.g., to reduce any tension or compression experienced by the flexible display caused by rotation of the first and second portions).

Figures 8C, 8D:
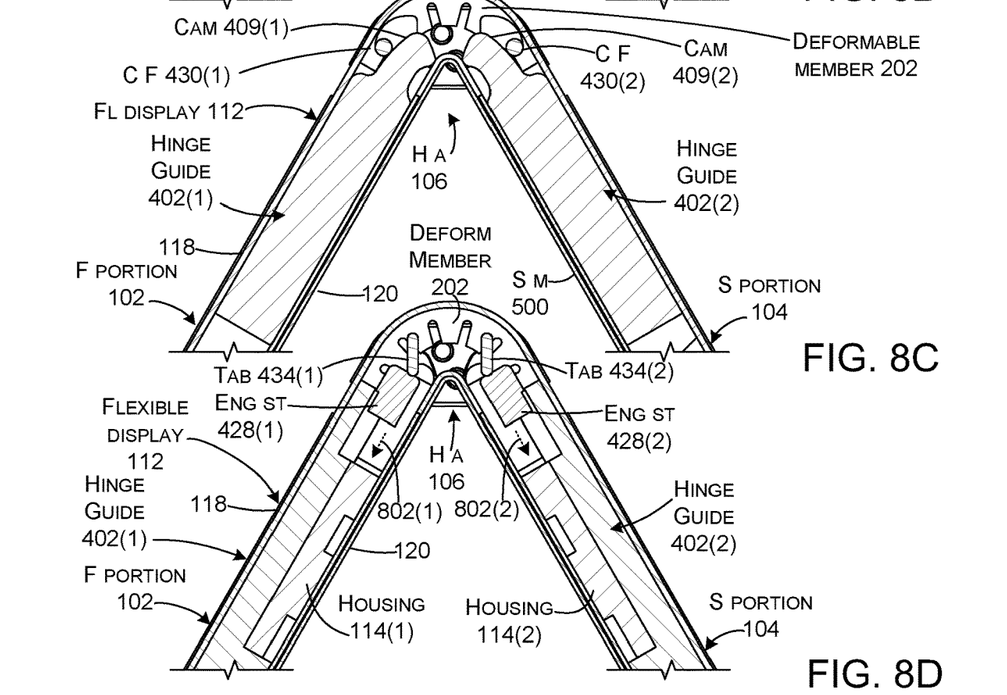

FIG. 8C shows cams 409 riding under cam followers 430 (e.g., the cam followers 430 are proximate to the first side 118 (e.g., the flexible display 112)) and the cams 409 are distal to the first side (e.g., proximate to the second side 120). The cams 409 are not actively engaging the cam followers 430 in a manner that controls the extent to which the hinge guides 402 can extend into the hinge assembly 106 (compare to FIGS. 5C, 6C, and/or 7C where the engagement of the cams 409 and cam followers 430 controlled the position of the hinge guides 402). At this point, the cam followers 430 are positioned in the first and second portions 102 and 104 so the cam followers are not actively engaging the deformable member 202, and the deformable member is generally arcuate and supporting the flexible display 112 over the hinge assembly 106 between the first and second portions.

FIGS. 8B and 8D show the bridge structures 302 being forced out of the hinge assembly 106 toward the first and second portions 102 and 104. Specifically, FIG. 8D shows the bridge structures' engagement structures 428 being forced away from the hinge assembly by the second end of the communication member 418's tabs 434 as indicated by arrows 802. This moves the bridge structures 302 as indicated by arrows 804 in FIG. 8B.

FIGS. 9A-9D show the first and second portions 102 and 104 rotated to a closed orientation with the first side 118 facing outwardly and the second side 120 facing inwardly (e.g., 360 degrees of rotation from the zero-degree orientation of FIGS. 5A-5D).

Figures 9A, 9B, 9C, 9D:
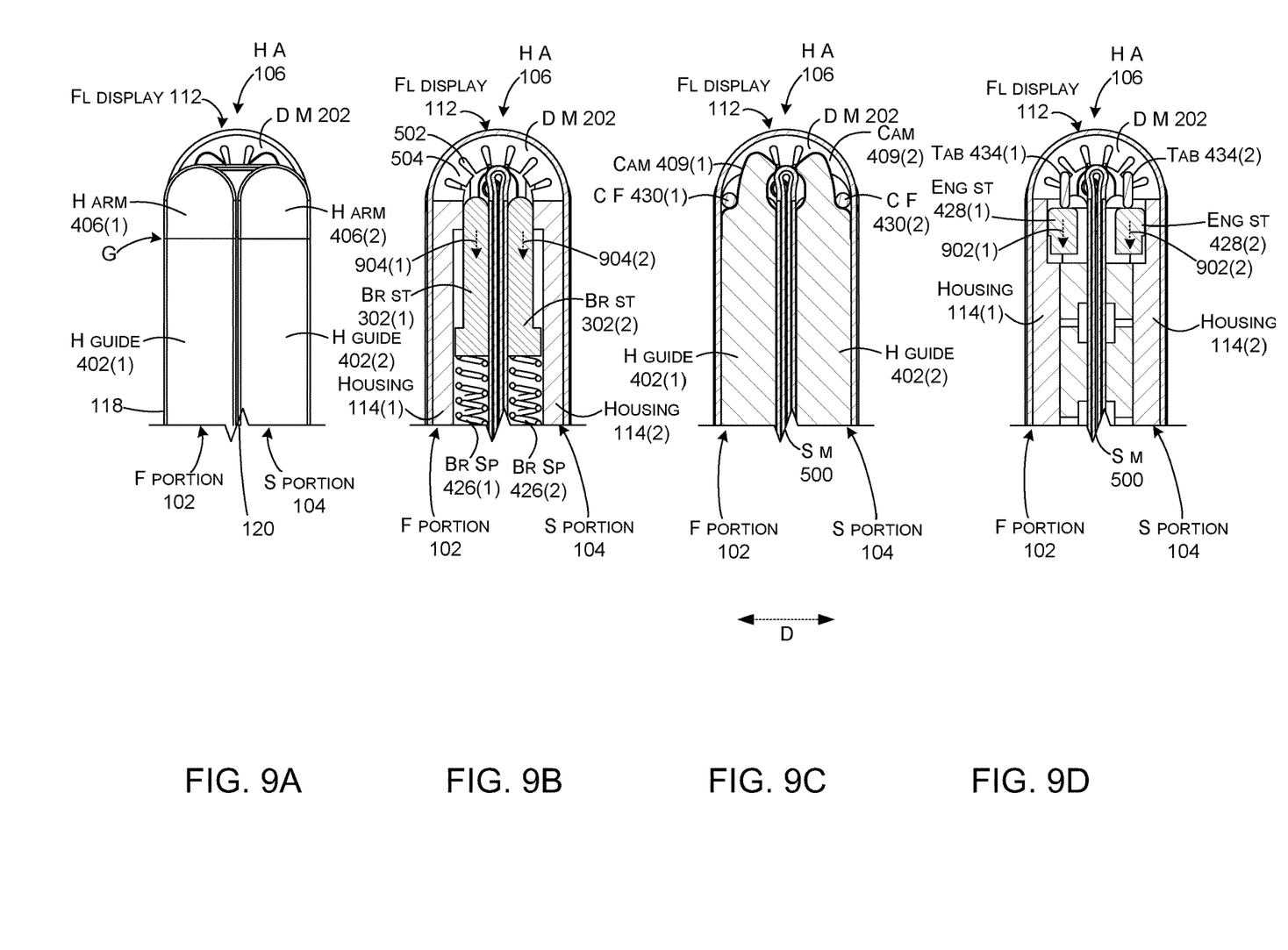

FIG. 9A shows gap G between the hinge arms 406 and the hinge guides 402 has been reduced to zero to accommodate the flexible display 112. FIG. 9C shows cams 409 traveling past cam followers 430 so that the bias of hinge springs (408, FIG. 4C) is able to move the hinge guides 402 toward the communication member 418 until the hinge guides 402 contact the hinge arms 406 (e.g., gap G is zero). The flexible display is now on the outside of the hinge assembly 106 and would experience tension forces except that the hinge assembly is shortened accordingly as reflected in gap G to diminish the tension forces. From one perspective, the hinge springs (408, FIG. 4C) bias the hinge assembly 106 to a relatively shorter length (reflected as gap G of FIG. 9A). In some orientations, the cams 409 and cam followers 430 overcome this bias and increase the relative length of the hinge assembly 106 (see gap G of FIGS. 6A and 7A) (e.g., relatively longer hinge assembly).

FIGS. 9B and 9D show the tabs 434 oriented perpendicular to the engagement structures 428 and forcing the engagement structures downward into the first and second portions 102 and 104 as indicated by arrows 902. This downward movement overcomes the bias created by the bridge springs 426 that would otherwise bias the bridge structures 302 toward the hinge assembly 106. Now, the bridge springs 426 are compressed and the bridge structures 302 are moved into the first and second portions 102 and 104 as indicated by arrows 904 and held in this position by the tabs 434.

FIG. 9B also shows the gaps 502 of the deformable member 202 fully closed and the adjacent material 504 abutting to produce a smooth continuous curve in the deformable member to support the flexible display 112.

Thus, the hinge assembly 106 accommodates the flexible display 112 during rotation and reduces forces imparted on the flexible display that could degrade the flexible display. This configuration can allow a single flexible display to span the first and second portions 102 and 104 and the hinge assembly 106 and thereby simplifies display design and enhance the user experience associated with a single large flexible display. Other implementations could employ multiple flexible displays.

Individual elements of the hinge assemblies 106 can be made from various materials, such as metals, plastics, foams, polymers, and/or composites. These materials can be prepared in various ways, such as in the form of sheet metals, die cast metals, machined metals, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1A-9D.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

ADDITIONAL EXAMPLES

Various device examples are described above. Additional examples are described below. One example includes a device comprising a first portion and a second portion that have hinge ends rotatably secured by a hinge assembly, a flexible display secured to the first portion and the second portion, and a deformable member secured to the flexible display over the hinge assembly. The device further comprises a first bridge structure that is associated with the first portion and is biased from the first portion into the hinge assembly and toward the second portion when the first and second portions are rotatably positioned in an open orientation to support the deformable member and biased away from the second portion and back into the first portion when the first and second portions are positioned in a closed orientation. The device further comprises a second bridge structure that is associated with the second portion and is biased from the second portion into the hinge assembly and toward the first portion when the first and second portions are rotatably positioned in an open orientation to support the deformable member and biased away from the first portion and back into the second portion when the first and second portions are positioned in a closed orientation.

Another example can include any of the above and/or below examples where the flexible display is fixedly secured to both the first portion and the second portion.

Another example can include any of the above and/or below examples where the flexible display comprises a single flexible display.

Another example can include any of the above and/or below examples where the deformable member comprises a corrugated pattern.

Another example can include any of the above and/or below examples where the corrugated pattern is on one side and an opposite side is flat.

Another example can include any of the above and/or below examples where the deformable member defines a minimum bend radius for the flexible display.

Another example can include any of the above and/or below examples where the closed orientation is at zero degrees between the first and second portions and 360 degrees between the first and second portions and the open orientation is 180-degrees between the first and second portions.

Another example can include any of the above and/or below examples where the device further comprises a cam that controls a position of the first bridge structure relative to the hinge assembly.

Another example can include any of the above and/or below examples where the hinge assembly comprises a cam follower and where interaction of the cam and the cam follower during rotation of the first and second portions controls the position of the first bridge structure relative to the hinge assembly.

Another example can include any of the above and/or below examples where the hinge assembly comprises a communication member that defines a hinge axis of the device.

Another example can include any of the above and/or below examples where the hinge ends are rotatablycorr secured to the communication member.

Another example can include any of the above and/or below examples where the cam comprises a tab on the communication member to which the hinge ends are rotatably secured and the communication member defines a hinge axis of the device.

Another example can include any of the above and/or below examples where the cam follower comprises an engagement structure of the first bridge structure.

Another example can include any of the above and/or below examples where a length of the hinge assembly changes during rotation of the first and second portions.

Another example can include any of the above and/or below examples where the hinge assembly is biased to a relatively shorter length and where the hinge assembly further comprises a cam and cam follower that counter the bias to a relatively longer length during a range of the rotation.

Another example can include a device comprising a first portion and a second portion that have hinge ends rotatably secured by a hinge assembly and further comprising and a flexible display positioned over the first portion, the hinge assembly, and the second portion. The device further comprises a deployable bridge support that is deployed to support the flexible display at the hinge assembly when the first and second portions are rotated from a closed orientation to an open orientation.

Another example can include any of the above and/or below examples where the deployable bridge support directly supports the flexible display at the hinge assembly.

Another example can include any of the above and/or below examples where the deployable bridge support indirectly supports the flexible display at the hinge assembly.

Another example can include any of the above and/or below examples where the device further comprises a re-enforcing material secured to the flexible display proximate to the hinge assembly.

Another example can include any of the above and/or below examples where the deployable bridge support directly supports the re-enforcing material.

Another example can include any of the above and/or below examples where the re-enforcing material comprises a deformable member.

Another example can include a device comprising a first portion and a second portion that have hinge ends rotatably secured by a hinge assembly and further comprises a flexible display positioned over the first portion, the hinge assembly, and the second portion. The device further comprises a bridge structure that is biased from the first portion into the hinge assembly and toward the second portion when the first and second portions are rotatably positioned in an open orientation to support the flexible display and biased away from the second portion and back into the first portion when the first and second portions are positioned in a closed orientation.

Another example can include any of the above and/or below examples where the bridge structure directly contacts the flexible display to support the flexible display.

Another example can include any of the above and/or below examples where the flexible display is secured to a deformable member that overlays the hinge assembly and where the bridge structure contacts the deformable member to indirectly support the flexible display.

The invention claimed is:

1. A device, comprising:
   a first portion and a second portion that have hinge ends rotatably secured by a hinge assembly;
   a flexible display secured to the first portion and the second portion;
   a deformable member secured to the flexible display over the hinge assembly;
   a first bridge structure that is associated with the first portion and is biased from the first portion into the hinge assembly and toward the second portion when the first and second portions are rotatably positioned in an open orientation to support the deformable member and biased away from the second portion and back into the first portion when the first and second portions are positioned in a closed orientation; and,
   a second bridge structure that is associated with the second portion and is biased from the second portion into the hinge assembly and toward the first portion when the first and second portions are rotatably positioned in the open orientation to support the deformable member and biased away from the first portion and back into the second portion when the first and second portions are positioned in the closed orientation.

2. The device of claim 1, wherein the flexible display is fixedly secured to both the first portion and the second portion.

3. The device of claim 1, wherein the deformable member comprises a corrugated pattern.

4. The device of claim 1, wherein the deformable member defines a minimum bend radius for the flexible display.

5. The device of claim 1, wherein the closed orientation is at zero degrees between the first and second portions and 360 degrees between the first and second portions and the open orientation is 180-degrees between the first and second portions.

6. The device of claim 1, further comprising a cam that controls a position of the first bridge structure relative to the hinge assembly.

7. The device of claim 6, wherein the hinge assembly comprises a cam follower and wherein interaction of the cam and the cam follower during rotation of the first and second portions controls the position of the first bridge structure relative to the hinge assembly.

8. The device of claim 7, wherein the hinge assembly comprises a communication member that defines a hinge axis of the device.

9. The device of claim 8, wherein the hinge ends are rotatably secured to the communication member.

10. The device of claim 9, wherein the cam comprises a tab on the communication member to which the hinge ends are rotatably secured.

11. The device of claim 10, wherein the cam follower comprises an engagement structure of the first bridge structure.

12. The device of claim 1, wherein a length of the hinge assembly changes during rotation of the first and second portions.

13. The device of claim 12, wherein the hinge assembly is biased to a relatively shorter length and wherein the hinge assembly further comprises a cam and cam follower that counter the bias to a relatively longer length during a range of the rotation.

14. A device, comprising:
- a first portion and a second portion that have hinge ends rotatably secured by a hinge assembly;
- a flexible display positioned over the first portion, the hinge assembly, and the second portion;
- a re-enforcing material secured to the flexible display proximate to the hinge assembly; and,
- a deployable bridge support having a pair of bridge structures that are slidably secured relative to the first and second portions, respectively, and slidably secured relative to the hinge assembly, and where the pair of bridge structures slide away from the first and second portions and slide toward the hinge assembly to indirectly support the flexible display at the hinge assembly when the first and second portions are rotated from a closed orientation to an open orientation.

15. The device of claim 14, wherein the deployable bridge support directly supports the re-enforcing material.

16. The device of claim 14, wherein the re-enforcing material comprises a deformable member.

17. A device, comprising:
- a first portion that has a first hinge end rotatably secured by a hinge assembly and that rotates around a first hinge axis;
- a second portion that has a second hinge end rotatably secured by the hinge assembly and that rotates around a second hinge axis;
- a flexible display positioned over the first portion, the hinge assembly, and the second portion; and,
- a first bridge structure and a second bridge structure that are slidably biased away from the first portion and the second portion, respectively, and towards the hinge assembly, the first bridge structure and the second bridge structure being positioned away from the first portion and the second portion, respectively, and towards the hinge assembly when the first and second portions are rotatably positioned in an open orientation to support the flexible display and being positioned away from the hinge assembly and back into the first portion and the second portion, respectively, when the first and second portions are positioned in a first closed orientation having a display side of the first and second portions facing inward.

18. The device of claim 17, wherein the first and second bridge structures directly contact the flexible display to support the flexible display.

19. The device of claim 17, wherein the flexible display is secured to a deformable member that overlays the hinge assembly and wherein the first and second bridge structures contact the deformable member to indirectly support the flexible display.

20. The device of claim 17, wherein the first bridge structure supports the flexible display at least at the first hinge axis and the second bridge structure supports the flexible display at least at the second hinge axis when the first and second portions are in the open orientation.

21. The device of claim 17, wherein the hinge assembly shortens by moving hinge guides towards hinge arms when the first and second portions are positioned in a second closed orientation having the display side of the first and second portions facing outward.

22. The device of claim 17, further comprising:
- paddles that engage the flexible display towards a linear configuration when the first and second portions are rotatably positioned into the open orientation.

* * * * *